May 16, 1961 R. M. STRIEBY ET AL 2,984,107
PITOT STATIC TUBE
Filed Sept. 16, 1957 2 Sheets-Sheet 2
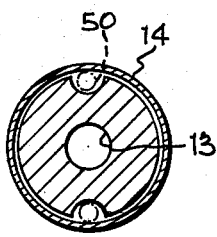
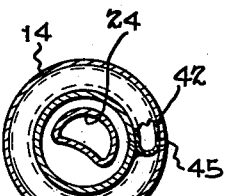
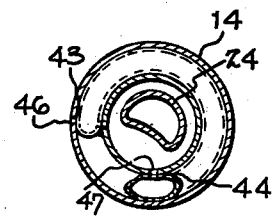
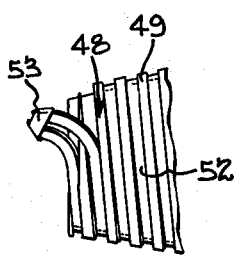
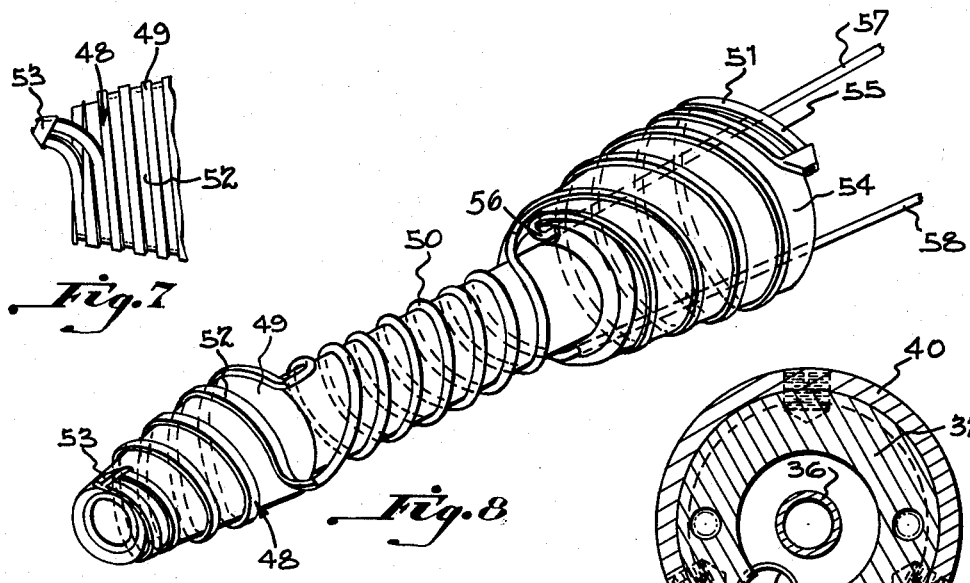
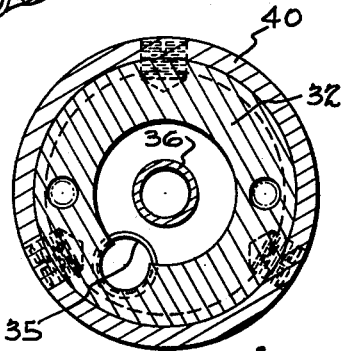
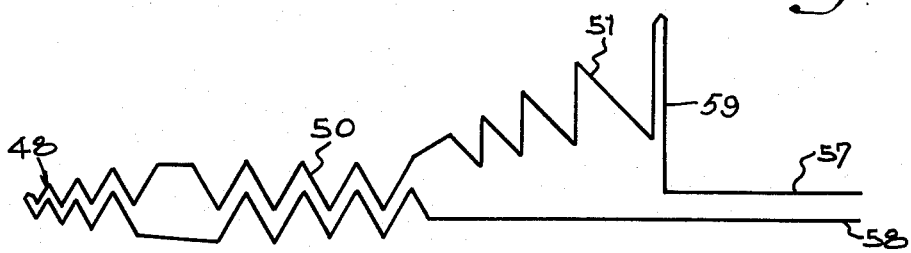
INVENTORS.
Robert M. Strieby.
BY Donald H. Mohring.
Wood, Herron & Evans.
ATTORNEYS.

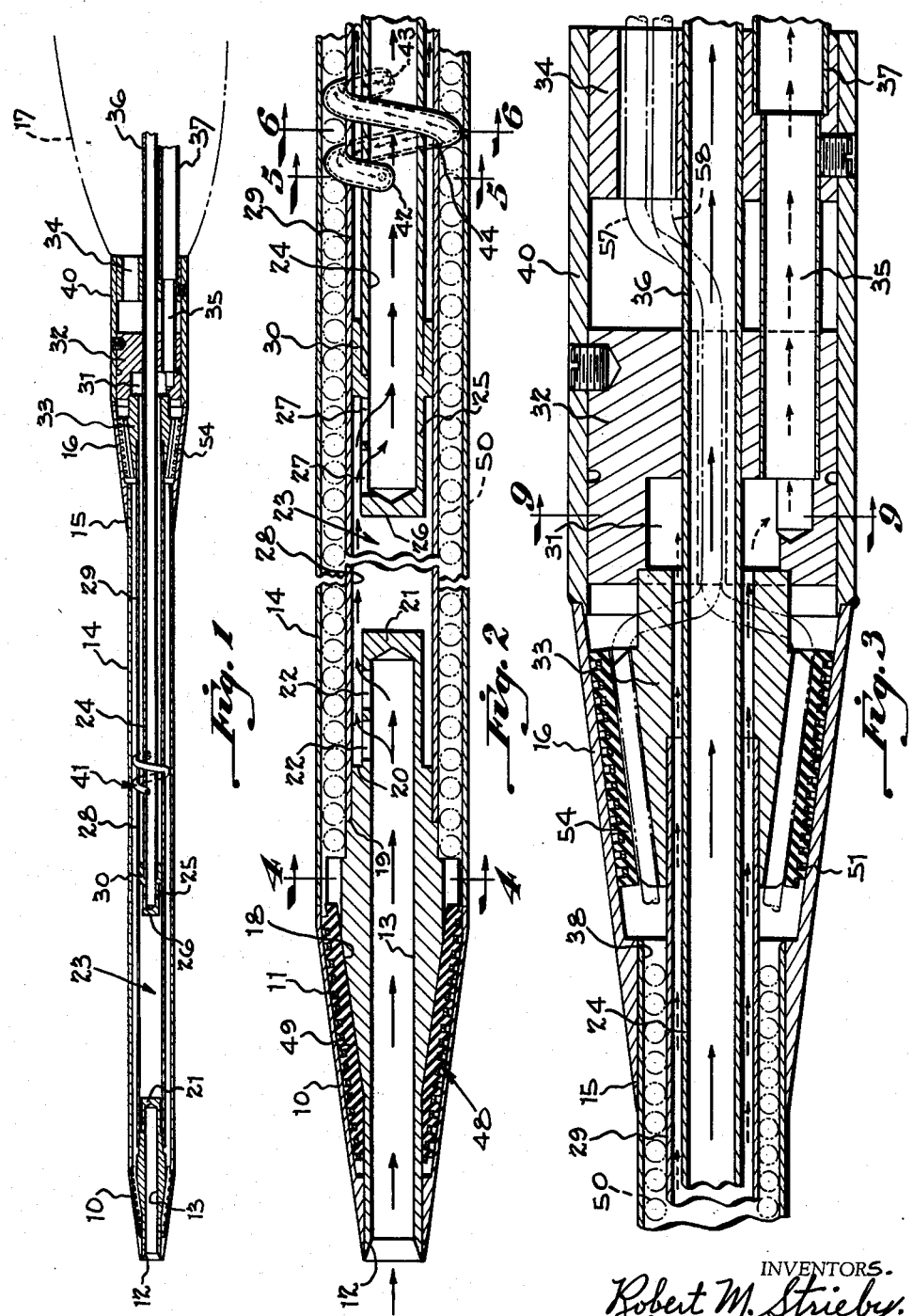

United States Patent Office 2,984,107
Patented May 16, 1961

2,984,107

PITOT STATIC TUBE

Robert M. Strieby and Donald H. Mohring, Cincinnati, Ohio, assignors to U.S. Industries, Inc., a corporation of Delaware Filed Sept. 16, 1957, Ser. No. 684,128

15 Claims. (Cl. 73—212)

This invention relates to Pitot static tubes which are employed in aircraft to obtain a measurement of air speed. More particularly, it relates to an improved Pitot tube having heating means whereby ice formation in and around the tube is prevented.

Pitot tubes have been known and in common use for many years. In essence, the tube is simply a device to measure static and total air pressure. By static pressure is meant the pressure of the air through which the aircraft is flying due to the random motion of the air molecules, i.e., atmospheric pressure. By total pressure, or ram pressure as it is sometimes called, is meant the pressure exerted by the air on the aircraft due to the motion of the aircraft relative to the air. In other words, static pressure is the pressure exerted on a surface parallel to the direction of flight, while total pressure is the pressure exerted on a surface normal to the direction of flight, the total pressure always being greater than the static pressure. The difference between the two is a function of the velocity of the aircraft, and therefore, by a fundamental relation, if the two pressures are known, the velocity of the aircraft may be determined.

The motion of the aircraft through the air sets up turbulence and eddies in the air immediately surrounding it. The total and static pressures right at the surface of the aircraft itself are distorted by this turbulence. Therefore, in order to obtain undistorted measurements, pressures must be measured at a point beyond the turbulent masses of air surrounding the aircraft. Typically, the pressures are measured at the tip of a tube extending forwardly from the wing tip into the undisturbed air in front of the wing. With modern, high speed aircraft, the pressure layer increases greatly and it becomes necessary to use a long boom projecting forwardly from the nose or wing to obtain accurate pressure measurements.

A Pitot tube is actually two tubes, a smaller open-end total pressure tube inside a larger, closed and static pressure tube having lateral openings in its side wall. Air whose total pressure is to be measured rushes into the total pressure tube through its open, forward end, until the pressure of the air in that tube equals the pressure of the air stream impinging upon the front end of the column of air in the tube. Air whose static pressure is to be measured enters the static pressure tube through the orifices in its side wall until the pressure in that tube balances the pressure of the air at the orifice. Passageways lead from the rear ends of the total and static pressure tubes to pressure-sensitive instruments on the instrument panel of the aircraft, which instruments are usually calibrated to read directly in terms of the air speed of the aircraft. Such instrumentation is well-known in the art and comprises no part of the present invention.

The common difficulty of all Pitot tubes is their inherent tendency to become heavily laden with masses of ice under certain weather conditions, as for instance where the plane passes through rain clouds in low temperature areas. Ice collects on the tube, and if the mass becomes large enough, it may stress the cantilevered tube so severely as to bend it or even break it off. Furthermore, water from moisture-laden air condensing and freezing on the tube blocks it and disrupts the pressure measurements.

Many attempts have been made to provide means whereby a Pitot tube may be heated to prevent ice forming on it. These have largely been ineffective because of the heavy current drain caused by the concomitant electrical heater and by the relatively large size of a tube which has an adequate heater in it. It must be remembered that a large Pitot tube moving at high speed will itself promote turbulence in the air around it with resultant distortion of the measurements it takes. Therefore, the size, and more particularly the diameter, of the tube must be kept as small as is possible.

A further complication arising from the use of heated Pitot tubes is that of a differential in the expansion rates of the total pressure and static tubes relative to the outer covering tube. The outside tube is not heated to as great a degree as the inner total pressure tube since the outside tube is cooled by the air rushing over it while the inner tube is not. If both tubes are of the same length when cold, they are of unequal length when heated, the outer tube becoming shorter relative to the inner tube. If the two tubes are rigidly connected to one another at two or more longitudinal positions, the expansion differential may cause the connections to break or may cause the tubes to warp, bend, or even split. Because of this, some connective means between the two tubes must be employed which will readily permit one tube to translate longitudinally with respect to the other while permitting no air to leak from one tube into the other. In the preferred embodiment of this invention the connective means employed serve the additional function of strengthening the structure to provide a rugged Pitot tube capable of withstanding the stresses of high speed maneuvers.

It is the primary object of this invention to provide a small yet durable Pitot tube having an electrically operated heater capable of preventing ice formation on the tube and to provide a connective device between the separate, air-tight, internal systems of the Pitot tube which, while sufficiently strong, will permit relative expansion of the systems in the tube.

The Pitot tube of this invention consists of three axially concentric tubes; an outer cover tube, a middle static pressure tube, and an innermost total pressure tube. Heating is accomplished by means of a series of spiral windings of electrically resistant wire occupying the annular space between the static pressure tube and the cover tube.

Other objectives and further advantages of the invention are best disclosed in relation to the accompanying drawings which illustrate a preferred configuration of the Pitot tube.

In the drawings:

Figure 1 is a longitudinal cross sectional view of a Pitot tube incorporating the principles of the present invention.

Figure 2 is an enlarged cross sectional view of the front portion of Figure 1 showing the details of the forward part of the tube.

Figure 3 is an enlarged cross sectional view showing the details of the middle and rear portions of the tube.

Figure 4 is a cross sectional view taken on the line 4—4 of Figure 2.

Figure 5 is a cross sectional view taken on the line 5—5 of Figure 2.

Figure 6 is a cross sectional view taken on the line 6—6 of Figure 2.

Figure 7 is a fragmentary elevational view showing the details of the heating core in the nose of the assembly.

Figure 8 is a diagrammatic perspective view showing one form of the electrical circuit for the Pitot tube.

Figure 9 is a cross sectional view taken on the line 9—9 of Figure 3.

Figure 10 is a diagram of an alternate wiring system.

The nose of the Pitot tube is formed by a thin-walled, funnel-like front outer cone 10. Because the icing conditions are the most severe at the tip of a Pitot tube, where ice tends to accumulate in the entrance to the total pressure tube, the front outer cone is preferably made of a highly conductive metal. A heating coil 11 is located just inside the front outer cone, as will subsequently be described. Near its front edge, the cone 10 is affixed to a lip 12 at the forward end of a front inner member or throat 13. The rear rim of cone 10 is fastened by brazing or the like to a lapped break-edge at the forward end of a cylindrical covering or outer tube 14. The joint here must be very smooth so as to set up no turbulence in the air flowing over it. The main outer tube or covering is fabricated from an elongated piece of thin-walled tubing, the tubing preferably being made of a material such as stainless steel. At its rear edge, the outer tube is connected to the inside of a lip 15 formed at the forward end of a rear conical outer member 16. The rear edge of member 16 is connected by a brazed lapped break edge to a tubular rear body or boom 40, the boom projecting back into the wing or nose 17 of the aircraft and being supported therefrom.

As is best seen in Figure 2, the front inner member or throat 13 extends rearwardly, its axis coinciding with the axis of the nose cone 10. Rearwardly of the lip 12, the outer surface of the front inner member is tapered as at 18, the taper being similar to that of the front outer cone, so that the perpendicular distance between the two surfaces is constant and the space between them constituting a conical chamber of uniform thickness. Rearwardly, the inner member is of stepped cylindrical shape, presenting shoulders 19 and 20.

The axial bore, constituting the throat, extends almost through the inner member so that the member presents to the inrushing air, whose total or ram pressure is to be measured, the aspect of a plugged tube. Forwardly of the plug, designated 21, radial holes 22—22 extend through the wall of the throat to provide a passageway into a rain trap chamber 23. The portion of the plugged inner member rearwardly of the radial hole also functions as a rain trap and some water droplets which enter the throat of this member are trapped in the rear portion. However, to insure that no water can enter into the total pressure tube itself, which tube is designated 24, the forward end of the tube 24 is capped as at 25, the capped end being at the rear of the rain trap chamber 23. The cap itself, it will be noted, is plugged at its forward end 26 and it has radial holes 27—27 in it which open from chamber 23 into the inside of tube 24.

Since the throat communicates with the tube 24 by means of the radial holes 22—22 and 27—27, the pressure of the air in tube 24, which will be described later, equals the pressure of the air in the throat. The pressure of the air in the throat is, of course, equal to the total pressure of the air stream impinging upon it at the opening at the forward end of the Pitot tube.

The rear end of the front inner cone member seats on a forward extension 28 of a tube 29, the extension 28 at its forward end being slipped over and brazed to the cylindrical step on the inner member, which is just to the rear of shoulder 19. The tube 29 receives a skirt 30 of cap 25, the skirt plugging the annular area around the total pressure tube (which is seated within the inside of the skirt) and closing the rear end of the rain trap chamber. The tube 29, to the rear of the skirt constitutes the static pressure tube of the assembly and the skirt blocks its forward end preventing air, at total pressure, from entering it.

The total pressure tube, whose axis is coincidental with that of the outer cylindrical tubular cover projects rearwardly through the center of the Pitot tube assembly. The static pressure tube surrounds the total pressure tube and is coextensive with it to a manifold chamber 31 within a plug or collar 32 adjacent to the rear of the assembly. The total pressure tube extends through the plug 32. This relationship will be explained in detail at a later point. It will be seen, therefore, that the inner wall of the static pressure tube is spaced from the outer wall of the total pressure tube by an amount equal to the thickness of the skirt 30 to provide a static pressure chamber. If the annular area between the facing surfaces of the two tubes is not big enough to provide a good static pressure air passageway, the total pressure tube may be crimped to a D-section, as is shown in Figure 5, throughout this longitudinal region.

The rear end of the static pressure tube is slidably received within a central bore formed in a rear heating core mount 33, the mount being tapered externally. The total pressure tube 24 extends rearwardly beyond the mount 33, through chamber 31, and through an axial bore in plug 32. The static pressure chamber itself extends beyond the end of the static pressure tube, into chamber 31, and then through an outlet bore in the wall of the plug 32 and ultimately opens out into a passageway below the total pressure tube and parallel to it. As described above, the total pressure tube runs through an axial bore in the plug 32, and it too is slidably received in this bore. The tube 24, to the rear of plug 32 is also journalled, in slip-fit relation, within another plug 34. A short length of tubing 35 paralleling the total pressure tube is also mounted in appropriate bores in the two plugs 32 and 34 to provide a passageway to the rear for static pressure. From this point the tubes are connected by lines, such as those indicated generally at 36 and 37, to instruments inside the aircraft following conventional practices.

At its rear end 38, the outer covering tube 14 is positioned in and fastened to a cylindrical internal bore which is formed as an integral part of a rear outer cone member 16. The wall of the outer cone is parallel to the outer surface of the heating core mount 33, and, like in the case of the forward cone a uniformly walled conical chamber is formed between their adjacent surfaces. At its rear edge the rear outer cone is affixed to a lapped break edge on a cylindrical rear outer body member 40 which fits over the two plugs 32 and 34.

Outside air whose static pressure is to be measured is admitted into the static pressure tube through a passageway formed by a short, coiled, flexible metal tube indicated generally at 41. Both ends of this tube are closed. At points 42 and 43, each closely adjacent one of the two plugged ends of the coiled tube, the wall of the tube is facially welded or brazed to the inner surface of the cover tube. At point 44, in the middle of the coiled tube, the wall of the tube is similarly facially attached to the outer surface of the static pressure tube. Two radial openings 45 and 46 which extend inwardly through the outer covering tube 14 into the coiled tube within the brazed regions of facial contact of the two tubes, admit air from the outside to the coiled tube. A similar third radial hole 47 from the coiled tube into the static pressure tube admits the air into the latter. In addition to providing a passageway, the coiled metal tube serves as a spacer axially locating the static pressure tube within the outer tube, thereby adding rigidity to the entire structure. And thirdly, because this connective passageway is in the form of a spiral and is held rigidly only at three points, it can be compressed or stretched, like a simple coil spring, by a longitudinal translation of one of the two tubes to which it is attached relative to the other as, for example, when heating causes one of the tubes to expand or contract. No matter how distended or compressed, within limits, imposed only by its length, the coiled tube will admit air into the static pressure tube from the outside.

As previously explained, because of icing conditions that are frequently encountered, it is necessary to provide a means of heating the Pitot tube to prevent the formation on it of large masses of ice which might clog the total pressure air intake in the nose of the Pitot tube or otherwise seriously impair the operation of the tube and consequently the accuracy of the pressure measurements. In the present invention, electrical heaters are located just under the outer surface of the Pitot tube along its entire length. A nose heating element, indicated generally at 48, is wound on a spirally grooved ceramic insulating cone 49 which is located in the conical chamber bounded by the inner surface of the front nose cone and the outer surface of the front inner member. It is of the utmost importance that the nose heating element extend as far as is possible into the tip of the Pitot tube, as ice tends to accumulate most right at the very tip. To best conduct heat from the nose heater to the tip, the front inner cone is preferably made of high heat-conductive metal. A main heater element 50, made of self-limiting wire, is wound directly on the static pressure tube and occupies the annular space between that tube and the main outer tube. A rear heat element 51 is wound on a second spirally grooved ceramic insulating cone 54 which occupies the space between the rear cone and the core mount 33.

Each of the three heater elements is wound individually and then connected in a series circuit with the others when the tube is assembled. The ceramic cone 49 on which the nose heater is mounted is best shown in Figure 7. The cone has tapered multiple external "threads," the threads being of rectangular or square section, and ribbon-like or flat electrically resistant heater wire 52 resides in the grooves between the threads, the thread thus serving as spacers and locating guides. In winding the wire in the grooves of the nose heater cone, the flat wire is doubled by first folding the wire across itself at its midpoint 53 so that it forms a right angle with itself, and then making a similar second fold across itself again so that the wire runs back parallel to itself, the folds being spaced from one another so that the adjacent sides of the parallel wires are spaced apart by just the width of the rectangular spacing threads. The folded end of the wire is hooked over the end of a thread where it runs out at the front of the cone, each wire spiralling rearwardly in its own registering groove, separated from its other parallel half by the thread. This particular type of fold is uniquely appropriate for use with rectangular or square wire as the wire lays flat across itself at each fold, there being a maximum concentration of wire right at the folds, at the tip of the cone, which is exactly that point at which a maximum concentration of heater wire is desirable. The spiral windings terminate at the rear end of the cone, where each wire is attached to one of the two parallel wires of the main heater element. This latter element consists of two parallel insulated wires of a thickness equal to the thickness of the annular space between the static pressure tube and the outer covering, so as to space the two tubes in relation to each other. The wires are wrapped rearwardly around the static pressure tube in turns of a pitch equal to that of the coiled metal tube 41 which constitutes the passageway from the cover tube into the static pressure tube, the turns of that coiled tube alternating with the turns of the heater element in that region. The rear heater element is wound on a ceramic cone 54 similar to that on which the nose element is wound. The winding on the rear cone may consist of a doubled-over ribbon of wire 53, the folded end of the wire being located at the rear of the cone rather than at the front. At the front of the cone, one of the ends 56 of the ribbon wire is connected to one of the two wires of the main heater. The other main heater wire and the other end of the rear heater wire are connected by leads 57—58 to the aircraft's source of electrical power. Alternatively, as shown in the diagram of Figure 10, the rear heater cone may consist of a single winding to the rear of the cone with a lead 59 going directly to the lead 57, this expediency avoiding the double winding on the cone. The details above described constitute a major part of this invention since it is only by such winding that an adequate distribution of heat over the skin of the Pitot tube is obtained.

When current flows in the heater elements, the resultant increase in temperature causes the tubes to expand both in their longitudinal and radial dimensions. The diameter of the tube is small, so that the lateral expansion is inconsequential, but long boom supported Pitot tubes of the present disclosure are of lengths such that their longitudinal expansion is considerable. The heat flowing from the heaters to the outer tube and to the static pressure tube is approximately equal, but the outside air rushing over the outer surface of the outer tube has a large cooling effect on it so that its temperature is considerably less than that of the inner static and total pressure tubes which are not so cooled and which, hot or cold, are always of equal length to each other. Consequently, a differential in temperature between the outer tube and the static pressure tube exists, with the result that the longitudinal expansion of the static pressure tube (and the total pressure tube which is at substantially the same temperature) is greater than that of the outer tube. When the heaters are turned off, all three tubes are essentially the same temperature and the same length. The unequal expansion permits no rigid mounting or coupling of the two; the joint would inevitably split or crack or the tubes would warp. It is to permit this expansion of the static and total pressure tubes relative to the outer tube that the pressure tubes are slidably received in the plugs and in the rear inner cone. Thus, while the inner and outer tubes are rigidly fastened to one another at their leading edges to better withstand the buffeting effects of the splitstream, relative longitudinal motion is permitted by the slidable rear coupling.

As the static pressure tube becomes hotter with respect to the outer tube and expands relatively rearwardly, the inlet hole of the static pressure chamber moves aft with respect to the hole in the outer wall. As this occurs the coiled tube 41, which provides a passageway between these two holes and which is rigidly fastened at each, is extended in springlike fashion. The length of the coiled tube freely permits the motion of its ends relative to each other without causing the welds or brazes at its ends to crack.

From the above it will be seen that, when atmospheric conditions such as tend to cause icing are encountered, the pilot may, by throwing a switch in the cockpit, cause current to flow in all three heater elements. The nose cone heater will prevent ice formation at the opening into the total pressure tube and around the tip. The main heater tube will loosen any ice formation on the body of the tube, and the air stream will force it rearwardly where it will either be cracked off upon hitting the rear outer cone or will be melted off by the rear heater. The fact that the air inside the total and static pressure tubes is warmed by the heaters and is therefore at a different temperature from the air outside does not affect its pressure at all, since the number of moles of air in the system is not fixed because the system is open ended. In a stable state the pressure of the air inside the tubes must equal that of the air outside, regardless of conditions of temperature, volume or quantity. Air is conducted to or from the static pressure chamber by the coiled tube regardless of the relative temperature or distension of the tubes which it connects. Because of the rigidity and support afforded by the metal coil 41 and the main heater windings, all the tubes may be of relatively thin-walled construction. This, in turn, means that smaller heaters may be used with less drain on the power supply, since there are no large masses of metal to be heated. It also means that the overall diameter of the tube may be kept at a minimum so as to present the smallest possible frontal area to the air through which the aircraft is flying. One factor, in addition to the others mentioned, which makes it possible to reduce this frontal area is the use of the D-shape portion of the total pressure tube, which D-shape is carried from a place just in front of the coiled tube 41 to a point to the rear of the static pressure tube where the total pressure tube passes through the chamber 31 as previously explained. To increase the overall area provided by the D-shape, it is found that the deformed part of the total pressure tube may be pushed over against the inner wall of the static pressure tube. This opens a substantially large area adjacent to the flat side of the D, and this flat side is at the side thereof which is adjacent to the opening from the coiled tube into the static pressure tube.

Having described our invention, we claim:

1. A heated Pilot static tube assembly comprising an elongated total pressure tube which is open to the atmosphere at its forward end, a static pressure tube which is larger in diameter than the total pressure tube and which surrounds the total pressure tube to provide an annular passageway between the two pressure tubes, the forward end of the static pressure tube terminating to the rear of the open forward end of the total pressure tube, means closing the space between the forward end of the static pressure tube and the total pressure tube, a cylindrical outer cover enclosing both tubes and terminating at its forward end in a tapered nose which is joined to the forward end of the total pressure tube, electrically resistant heating wire disposed in the space between the pressure tubes and the cylindrical outer cover and wound around the outside of the static pressure tube in helical turns, a helically coiled tube disposed between the outer cover and the static pressure tube and paralleling the turns of the coiled heating wire, said coiled tube being closed at both ends and being inter-facially attached to the outside of the static pressure tube at one point and being inter-facially attached to the inside of the outer covering member at a second point spaced axially of the coiled tube, there being a bore at each of the inter-facially attached points of the coiled tube passing, in one case, through the outer cover and, in the second case, passing through the wall of the static pressure tube to provide a passageway for air from the atmosphere into the static pressure tube, and said tube being unattached between said points, whereby the coiled tube may flex and thereby permit relative longitudinal movement between the pressure tubes and the outer covering member in the event the cover expands or contracts at a different rate than the tubes during heating and cooling of the assembly.

2. A heated Pitot static tube assembly as set forth in claim 1 in which the helically coiled tube makes one complete turn around the static pressure tube with points of attachment adjacent to the ends and a point of attachment between the ends, there being an opening at each of the first mentioned points of attachments through the coiled tube and the cover to the atmosphere, and there being a third opening at the latter mentioned point of attachment through the coiled tube and the static pressure tube.

3. In a heated Pitot tube having an internally disposed static pressure tube and an outer cover member, means providing a passageway between said tube and the atmosphere outside of said cover member comprising a helically coiled, flexible tube which is closed at both ends, the wall of said tube facially attached at one point to the inner surface of said covering member and facially attached to the outer surface of said static pressure tube at one other point which is spaced axially of the coiled tube from the first point, there being a bore extending through each of the inter-facial regions of attachment to admit air from the outside atmosphere into said coiled tube and from said coiled tube into said static pressure tube and said coiled tube being unattached to either the static pressure tube or the cover member between said points of attachment, whereby said coiled tube provides an extensible and flexible passageway permitting said static pressure tube to shift longitudinally with respect to the outer covering member.

4. In a heated Pitot static tube as set forth in claim 1, said coiled tube having a diameter equal to the annular space between the static pressure tube and the outer covering, whereby the coiled tube supports the static pressure tube within the covering member.

5. A heated Pitot static tube assembly comprising an elogated total pressure tube which is open to the atmosphere at its forward end, a static pressure tube which is larger in diameter than the total pressure tube and which surrounds the total pressure tube to provide an annular passageway between the two pressure tubes, the forward end of the static pressure tube terminating at a point substantially behind the open forward end of the total pressure tube, means closing the space between the forward end of the static pressure tube and the total pressure tube, a cylindrical outer cover which is larger in diameter than the static pressure tube enclosing both pressure tubes, a frusto-conical nose piece joined at its forward end to the forward end of the total pressure tube and joined at its rear end to the forward end of the outer cover to provide a chamber, a core in said chamber, electrically resistant heating wire wound helically around said core and continuing to the rear of the assembly around the static pressure tube, a helically coiled tube disposed between the outer cover and the static pressure tube and between adjacent turns of the helically wound heating wire, said coiled tube being of a diameter to fill the space between the cover and the static pressure tube to support said static pressure tube, said coiled tube closed at both ends and being inter-facially attached to the outside of the static pressure tube at one point and being inter-facially attached to the inside of the outer cover at a second point spaced axially of the coiled tube, there being a bore at each of the inter-facially attached points of the coiled tube passing, in one case, through the outer cover and, in the second case, passing through the wall of the static pressure tube to provide a passageway for air from the atmosphere into the static pressure tube, and said tube being unattached between said points, whereby the coiled tube may flex and thereby permit relative longitudinal movement between the pressure tubes and the outer cover in the event the cover expands or contracts at a different rate than the pressure tubes during heating and cooling of the assembly.

6. A heated Pitot static tube assembly as set forth in claim 5 in which the core substantially fills said chamber and is in intimate contact with said nose piece, and said nose piece being mode of a metal characterized by its high, heat conductivity to readily transfer heat from the coil to the tip of the nose piece.

7. A heated Pitot static tube assembly as set forth in claim 5 in which the core has two parallel helical grooves which are rectangular in cross section extending from the front to the rear thereof and a single electrically resistant heating ribbon being doubled over between its ends and being threaded rearwardly through the two grooves.

8. In a Pitot static tube having a closed end static pressure tube, an open end total pressure tube disposed within said static pressure tube, and a cylindrical cover enclosing said static and total pressure tubes, an attachment member locating said static pressure tube with respect to said cover, a coiled tube located in the annular area between said static pressure tube and said cover, the wall of said coiled tube being inter-facially attached to the inside of the wall of said cover and interfacially attached at another point removed therefrom to the outside of the wall of said static pressure tube, there being a radial bore extending through each interfacial attachment providing a connective air passageway from the outside into said static pressure tube, and the rear end of said static pressure tube being slidably mounted in said attachment member, whereby said static pressure tube may translate longitudinally with respect to said cover.

9. In a Pitot static tube as set forth in claim 8, electrically operated means to heat the nose portion of said tube, said means comprising a ceramic insulating member disposed immediately beneath said cover, an electrically resistant heating wire ribbon mounted on said ceramic member, the surface of said ceramic member being multiply threaded, the grooves between said threads being of a configuration appropriate to receive said ribbon, said ribbon being doubled at its midpoint, said midpoint being disposed at the front end of said ceramic member where a thread thereof runs out, each of the two parallel lying halves of said wire ribbon residing individually in a separate groove and spiraling rearwardly around said ceramic member to the other end thereof.

10. Electrical circuitry for heating elements in a Pitot tube having a frusto-conical rear portion, a forwardly extending cylindrical middle portion and a frusto-conical nose portion, said circuitry comprising in series connection a rear heating element would helically rearwardly then helically forwardly with the turns of the two windings paralleling each other, a spirally wound first middle winding, a nose heating winding wound helically forwardly and then helically rearwardly with the turns of the winding paralleling each other, and a second middle heating winding comprising a spiral winding, the turns of the last named winding alternating with the turns of the first named middle winding and being insulated therefrom, wherein the heat supplied to said Pitot tube from said circuitry is concentrated at said frusto-conical rear and nose portions.

11. Electrical circuitry as set forth in claim 10 in which the windings of the two middle windings are made of self limiting electrically resistant wire.

12. In a Pitot static tube having a closed end static pressure tube, an open end total pressure tube disposed within said static pressure tube and a cylindrical cover enclosing said static and total pressure tubes, a helically coiled tube disposed in the annular area between said static pressure tube and said cover, the ends of said coiled tube being closed, the wall of said coiled tube adjacent to one end thereof being inter-facially attached to the inside of the wall of said cover and inter-facially attached at another point removed therefrom to the outside of the wall of said static pressure tube, the latter named point being on the opposite side of the static pressure tube with respect to the first mentioned inter-facial attachment of the coiled tube to the cover, there being a radial bore extending through each inter-facial attachment providing a connective air passageway from the outside into said static pressure tube, and the total pressure tube in the portion thereof adjacent to the radial bore opening into said static pressure tube being substantially D-shaped in cross section with the flat side of the D-shape being toward said opening.

13. A Pitot static tube as set forth in claim 12 in which the total pressure tube is substantially D-shaped in cross section from the portion thereof adjacent to the coiled tube to a rearward point beyond the static pressure tube.

14. A heated Pitot tube structure comprising an elongated, tubular outer covering, tubular passage forming means disposed within said tubular covering and opening at the forward end of the structure to form a pressure passage, said tubular covering having a front portion tapering in cross section and joining at the front of the structure with the front portion of said passage forming means, the tapered front portion of said tubular covering having a length substantially greater than the diameter of said tubular covering, the front portions of said covering and passage forming means forming a sharp-edged tip portion of the structure and defining an elongated annular space of conical form surrounding the front portion of said passage forming means, a conical insert of electrically non-conductive material received in said annular space and having a front portion closely adjacent said tip portion, said insert being of greater length than diameter and having shallow, spiral recesses formed therein, and heating means comprising a length of flat, resistance wire received in said recesses.

15. A heated Pitot tube structure comprising an elongated tubular outer covering, tubular passage forming means disposed within said tubular covering and opening at the forward end of the structure to form a pressure passage, said tubular covering having a front portion tapering in cross section and joining at the front of the structure with the front portion of said passage forming means, the tapered front portion of said tubular covering having a length substantially greater than the diameter of said tubular covering, and means for heating said structure comprising a first heating element formed of a length of electrically resistant wire disposed within and extending substantially throughout the front portion of said tubular covering and surrounding the front portion of said passage forming means and a second heating element formed of a length of self-limiting resistance wire connected in series with said electrically resistant wire and disposed between said tubular covering and passage forming means back of the front portions thereof.

References Cited in the file of this patent

UNITED STATES PATENTS

| | | |
|---|---|---|
| 660,292 | Durr | Oct. 23, 1900 |
| 2,151,206 | Hawthorn | Mar. 21, 1939 |
| 2,325,018 | Moss | July 20, 1943 |
| 2,404,978 | Morton | July 30, 1946 |
| 2,428,542 | Bernhardt | Oct. 7, 1947 |
| 2,510,986 | Larkin | June 13, 1950 |
| 2,512,705 | Anderson | June 27, 1950 |
| 2,662,402 | Ince et al. | Dec. 15, 1953 |
| 2,706,408 | Holbrook | Apr. 19, 1955 |

FOREIGN PATENTS

| | | |
|---|---|---|
| 464,961 | Canada | May 9, 1950 |
| 750,417 | Great Britain | June 13, 1956 |